United States Patent [19]

Arai et al.

[11] Patent Number: 5,276,086
[45] Date of Patent: Jan. 4, 1994

[54] ADHESIVE COMPOSITIONS

[75] Inventors: Masatoshi Arai; Yoshifumi Inoue, both of Gunma, Japan

[73] Assignee: Shin-Etsu Chemical Company, Limited, Tokyo, Japan

[21] Appl. No.: 981,656

[22] Filed: Nov. 25, 1992

[30] Foreign Application Priority Data

Nov. 27, 1991 [JP] Japan .................. 3-337578

[51] Int. Cl.$^5$ .................................. C08K 5/54
[52] U.S. Cl. .................... 524/730; 524/861; 524/862
[58] Field of Search ............ 524/730, 861, 862

[56] References Cited

U.S. PATENT DOCUMENTS

| | | | |
|---|---|---|---|
| 3,699,072 | 10/1972 | Clark et al. | 260/375 B |
| 3,837,876 | 9/1974 | Mayuzumi et al. | 106/287 B |
| 4,196,273 | 4/1980 | Imai et al. | 524/862 |
| 4,329,273 | 5/1982 | Hardman et al. | 524/862 |
| 4,433,007 | 2/1984 | Marwitz et al. | 524/861 |
| 4,677,161 | 6/1987 | Suzuki et al. | 524/862 |
| 5,023,288 | 6/1991 | Hirai et al. | 524/731 |
| 5,173,529 | 12/1992 | Fujiki et al. | 524/730 |
| 5,180,771 | 1/1993 | Arai et al. | 524/858 |

FOREIGN PATENT DOCUMENTS

| | | |
|---|---|---|
| 0350951 | 1/1990 | European Pat. Off. . |
| 0384352 | 8/1990 | European Pat. Off. . |
| 0392877 | 10/1990 | European Pat. Off. . |
| 0492905 | 7/1992 | European Pat. Off. . |

OTHER PUBLICATIONS

Database WPIL, Derwent Publications Ltd., London, GB AN 91-158425 & JP-A-3 091 564 (Shin Etsu Chem. Ind. KK) Apr. 17, 1991.
Derwent Publication of Japan Kokai (Laid-Open) 50-39345.
Derwent Publication of Japan Kokoku (Examined) 55-41702.

Primary Examiner—Melvyn I. Marquis
Assistant Examiner—Karen A. Dean
Attorney, Agent, or Firm—Millen, White, Zelano & Branigan

[57] ABSTRACT

Adhesive compositions of this invention are characterized by the addition of certain silane compounds as adhesion promoters to addition curing type compositions which comprise a diorganopolysiloxane containing alkenyl groups bonded to silicon atoms and an organohydrogen polysiloxane containing hydrogen atoms bonded to silicon atoms, wherein the adhesion promoting silane compound, is of the formula:

$$(R^4O)_{3-a}-\underset{\underset{R^2}{|}}{\overset{\overset{(R^3)_a}{|}}{Si}}-\underset{}{\overset{\overset{R^1}{|}}{C}}-(CH_2)_n-COOR^3 \quad (1)$$

wherein $R^1$ and $R^2$ are either hydrogen atoms or lower alkyl groups, $R^3$ and $R^4$ are preferably lower alkyl groups and $a$ and $n$ are integers from 0 to 2.

10 Claims, No Drawings

ADHESIVE COMPOSITIONS

BACKGROUND OF THE INVENTION

This invention relates to adhesive compositions and their cured products, especially to adhesive silicone compositions of the self adhesive type and their cured products.

Currently, various types of adhesives such as polyurethane resins, acrylic resins, epoxy resins, and silicones are employed for the bonding of electric and electronic parts and for use as construction sealing agents. Among these, silicone type adhesives are most popularly utilized due to their superiority in heat resistance, weather resistance, electrical characteristics, and in the relaxation of stresses caused by heating and cooling.

Many proposals are still reported for these silicone type adhesives in order to further improve their adhesiveness. For example, compounds listed below have been proposed to be added as adhesion promoters: an organopolysiloxane with trialkoxy silyl groups and hydrogen atoms bonded to silicon atoms (reference: U.S. Pat. No. 3,699,072), an organopolysiloxane with hydrogen atoms bonded to silicon atoms and ester groups and/or glycidyl groups (reference: Japanese Patent application KOKAI (Laid Open) 50-39345), and reaction products between aminoalkyl alkoxysilane and glycidyloxy alkyl alkoxysilane (references: U.S. Pat. No. 3,837,876 and Japanese Patent Application KOKOKU (Examined) 55-41702).

However, none of the proposals based on the previous technologies as described above have improved adhesiveness to a satisfactory level. A severe deterioration in adhesiveness is especially observed when adhesives are stored at room temperature, or at higher temperatures, prior to usage. Further, the recent trends in energy conservation, and the utilization of materials which are difficult to adhere, demand silicone type adhesives which are particularly good with respect to their adhesiveness when cured at low temperature. However, such adhesives fulfilling the above demands have not been identified.

SUMMARY OF THE INVENTION

Therefore, a purpose of this invention is to provide silicone type adhesive compositions which possess superior and stable adhesiveness even when bonds are formed at low temperature, and the cured products prepared with these adhesive compositions.

This invention provides adhesive compositions which comprise:

(A) a diorganopolysiloxane which contains on average per molecule, at least two alkenyl groups which are bonded to silicon atoms, (B) an organohydrogen polysiloxane which contains on average per molecule at least three hydrogen atoms bonded to silicon atoms, (C) a silane compound of the chemical formula (1):

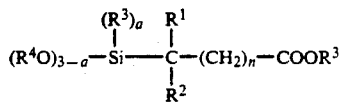
(1)

wherein $R^1$ and $R^2$ are either hydrogen atoms or alkyl groups and which can be the same or different, each $R^3$ independently is a substituted or an unsubstituted monovalent hydrocarbon group, $R^4$ is either an alkyl group or an alkoxyalkyl group, a designates integers from 0 to 2, and n designates integers from 0 to 2, and (D) an addition reaction catalyst.

The cured products prepared from these adhesive compositions are also provided.

An important characteristic of this invention is to combine silane compounds expressed by the above general chemical formula (1) as an adhesion promoter with conventional addition curing type silicone compositions. The addition curing type silicone compositions containing these silane compounds possess a superior adhesiveness when cured at relatively low temperatures, such as at the 60° C. level, as well as a stable adhesiveness to various types of substrates.

Component (A)

In the compositions of this invention, the diorganopolysiloxane component (A) is a base constituent which can be of a linear chain type, of a branched chain type, or a mixture of these.

The diorganopolysiloxane must possess at least two alkenyl groups which are bonded to silicon atoms, on an average per molecule. These alkenyl groups may exist at the end or in the middle of the molecular chain. Examples of suitable alkenyl groups typically comprise two to eight carbon atoms, such as vinyl, allyl, 1-butenyl, 1-hexenyl and the like. Among them, vinyl is the most desirable from the viewpoint of easy synthesis. The preferred number of alkenyl groups per molecule on average will vary in a wide range depending on the desired viscosity (discussed below). Other organic groups which may be bonded to the silicon atoms besides the alkenyl groups include substituted or unsubstituted monovalent hydrocarbon groups which usually have from 1 to 10 carbon atoms and more desirably from 1 to 8 carbon atoms. Examples include alkyl groups such as methyl, ethyl, propyl, butyl, hexyl, cyclohexyl, octyl, etc.; aryl groups such as phenyl, xylyl, naphthyl, etc.; aralkyl groups such as benzyl, 2-phenylethyl, 2-phenyl propyl, etc. The above groups each have a part or all of the hydrogen atoms substituted, e.g., with halogen atoms, thus forming a chloromethyl group, a 3, 3, 3-trifluoropropyl group, etc. Among these groups, methyl is the most suitable since corresponding compounds are easily synthesized, possess a low viscosity before curing, and still maintain a sufficient degree of polymerization to offer good physical properties after curing.

Furthermore, the adhesive compositions of this invention are utilizable especially for injection moldings, pottings, coatings and for impregnation. In these applications, maintenance of superior physical properties is required even after curing. Therefore, the viscosity of the diorganopolysiloxane at 25° C. is desired to be in the range from 50 to 100,000 cp, more preferably, in the range from 100 to 10,000 cp. For example, a lower viscosity than this level results in insufficient elongation capacity and elasticity after curing, and a higher viscosity tends to lead to poorer workability during injection molding, potting, and other operations. However, in the case that the adhesive compositions of this invention are utilized by curing them at room temperature, the viscosity of the diorganopolysiloxane at 25° C. can be at a higher preferred level, which means over 10,000 cp.

Component (B)

The organohydrogen polysiloxane component (B) functions as a crosslinking agent. It possesses at least three hydrogen atoms which are bonded to silicon atoms on an average per molecule. In other words these hydrogen atoms bonded to silicon atoms additively react with the alkenyl groups in the diorganopolysiloxane component (A) to form an elastic cured product.

The molecular structure of this organohydrogen polysiloxane can be a linear chain, a branched chain, a three dimensional network structure, or a mixture thereof. Examples of suitable organic groups bonded to silicon atoms in this organohydrogen polysiloxane are similar to the ones listed above for the diorganopolysiloxane, except for the alkenyl groups. The preferred number of hydrogen atoms per molecule on average will also vary in a wide range depending on the desired viscosity of Component B.

Further, the viscosity of this organohydrogen polysiloxane at 25° C. is desirably in the range from 0.5 to 10,000 cp. Components whose viscosity is less than 0.5 cp possess a low boiling point, which leads to easy volatility; those over 10,000 cp in viscosity make synthesis difficult.

In the adhesive compositions in this invention, the preferred amount of component (B) is sufficient to provide 0.5 to 10 equivalents of hydrogen atoms bonded to silicon atoms per one equivalent of alkenyl group in the component (A). When the amount of the utilized component (B) becomes less than 0.5, or more than 10 equivalents, the obtained cured products (addition reactants) have a low degree of crosslinking density. This leads to deterioration of physical properties, easy foaming during curing, and ready changes in physical properties of the cured products at high temperature.

Component (C)

Component (C) of this invention is a silane compound having the general chemical formula (1). This silane compound functions as an adhesion promoter as described above.

In this general formula (1), $R^1$ and $R^2$ are either hydrogen atoms or alkyl groups. Examples of suitable alkyl groups include lower alkyl groups which have at most four carbon atoms, such as methyl, ethyl, propyl, isopropyl, and butyl. Among these, methyl and ethyl groups are preferred.

$R^3$ is a substituted or an unsubstituted monovalent hydrocarbon group which usually has from 1 to 10 carbon atoms and more desirably from 1 to 8 carbon atoms. Specific examples include for example alkyl groups such as methyl, ethyl, propyl, isopropyl, butyl, isobutyl, hexyl, cyclohexyl, octyl, etc.; aryl groups such as phenyl, tolyl, etc.; alkenyl groups such as vinyl, allyl, etc.; aralkyl groups such as benzyl, phenylethyl, etc.; and the above groups in which a part or all of the hydrogen atoms are substituted with halogen atoms, e.g., to form chloromethyl 3, 3, 3-trifluoropropyl, etc.

The $R^3$ groups may all be the same or different.

Further, $R^4$ is either an alkyl group or an alkoxy alkyl group. Suitable examples of alkyl groups include ones with from 1 to 8 carbon atoms such as methyl, ethyl, propyl, isopropyl, butyl, isobutyl, hexyl, cyclohexyl, octyl, etc. Examples of alkoxyalkyl groups include methoxymethyl, methoxyethyl, ethoxymethyl, and ethoxyethyl, etc.

Listed below are preferred representative examples of the component (C) which are suitable in this invention. In the examples below Me, Et, Pr, Bu, Ph, and Cy designate methyl, ethyl, propyl, butyl, phenyl, and cyclohexyl, respectively.

$(MeO)_3$ Si—$CH_2$—COOMe
$(MeO)_3$ Si—$CH_2$—COOEt
$(MeO)_3$ Si—$CH_2$—COOPr
$(MeO)_3$ Si—$CH_2$—COO$C_8H_{17}$
$(MeO)_3$ Si—$CH_2$—COOPh
$(MeO)_3$ Si—$CH_2$—COOCy
$(MeO)_2$ (Me)—Si—$CH_2$—COOMe
$(MeO)_2$ (Me)—Si—$CH_2$—COOEt
$(MeO)_2$ (Me)—Si—$CH_2$—COOPr
$(MeO)_2$ (Me)—Si—$CH_2$—COO$C_8H_{17}$
$(MeO)_2$ (Me)—Si—$CH_2$—COOPh
$(MeO)_2$ (Me)—Si—$CH_2$—COOCy
$(MeO)$ $(Me)_2$—Si—$CH_2$—COOMe
$(MeO)$ $(Me)_2$—Si—$CH_2$—COOEt
$(MeO)$ $(Me)_2$—Si—$CH_2$—COOPr
$(MeO)$ $(Me)_2$—Si—$CH_2$—COO$C_8H_{17}$
$(MeO)$ $(Me)_2$—Si—$CH_2$—COOPh
$(MeO)$ $(Me)_2$—Si—$CH_2$—COOCy
$(EtO)_3$ Si—$CH_2$—COOMe
$(EtO)_3$ Si—$CH_2$—COOEt
$(EtO)_3$ Si—$CH_2$—COOPr
$(EtO)_3$ Si—$CH_2$—COOBu
$(EtO)_3$ Si—$CH_2$—COO$C_8H_{17}$
$(EtO)_3$ Si—$CH_2$—COOPh
$(EtO)_3$ Si—$CH_2$—COOCy
$(EtO)_2$ (Me)—Si—$CH_2$—COOMe
$(EtO)_2$ (Me)—Si—$CH_2$—COOEt
$(EtO)_2$ (Me)—Si—$CH_2$—COOPr
$(MeO)_3$ Si—CH(Me)—COOMe
$(MeO)_3$ Si—CH(Me)—COOEt
$(MeO)_3$ Si—CH(Me)—COOPr
$(MeO)_3$ Si—CH(Me)—COOBu
$(MeO)_3$ Si—CH(Me)—COO$C_8H_{17}$
$(MeO)_3$ Si—CH(Me)—COO$CH_2$ CH (Et) $C_4H_9$
$(MeO)_3$ Si—CH(Me)—COOPh
$(MeO)_2$ (Me) Si—CH(Me)—COOMe
$(MeO)_2$ (Me) Si—CH(Me)—COOEt
$(MeO)_2$ (Me) Si—CH(Me)—COOBu
$(MeO)_2$ (Me) Si—CH(Me)—COO$CH_2$ CH (Et) $C_4H_9$
$(MeO)_2$ (Me) Si—CH(Me)—COOPh
$(MeO)$ $(Me)_2$ Si—CH(Me)—COOMe
$(MeO)$ $(Me)_2$ Si—CH(Me)—COOEt
$(MeO)$ $(Me)_2$ Si—CH(Me)—COO$C_8H_{17}$
$(MeO)$ $(Me)_2$ Si—CH(Me)—COOPh
$(MeO)_2$ (Ph) Si—CH(Me)—COOMe
$(MeO)_2$ (Ph) Si—CH(Me)—COOEt
$(MeO)_2$ (Ph) Si—CH(Me)—COO$C_8H_{17}$
$(MeO)_2$ (Et) Si—CH(Me)—COOMe
$(MeO)_2$ (Et) Si—CH(Me)—COOEt
$(MeO)_2$ (Et) Si—CH(Me)—COOBu
$(EtO)_3$ Si—CH(Me)—COOMe
$(EtO)_3$ Si—CH(Me)—COOEt
$(EtO)_3$ Si—CH(Me)—COOBu
$(EtO)_3$ Si—CH(Me)—COO$CH_2$ CH (Et) $C_4H_9$
$(EtO)_2$ (Me) Si—CH(Me)—COOMe
$(EtO)_2$ (Me) Si—CH(Me)—COOEt
$(EtO)_2$ (Me) Si—CH(Me)—COOBu
$(EtO)_2$ (Me) Si—CH(Me)—COO$CH_2$ CH (Et) $C_4H_9$
$(EtO)_2$ (Me) Si—CH(Me)—COOMe
$(EtO)_2$ (Me) Si—CH(Me)—COOEt
$(MeO)_3$ Si—CH(Et)—COOMe (MeO)₃ Si—CH(Et)—COOEt
(MeO)₂ (Me) Si—CH(Et)—COOMe
(BuO)₃ Si—CH₂—COOMe
(BuO)₃ Si—CH₂—COOEt
(C₈H₁₇O)₃ Si—CH₂ COOEt
(MeO)₃ Si—(CH₂)₂—COOMe
(MeO)₃ Si—(CH₂)₂—COOEt
(MeO)₃ Si—(CH₂)₃—COOMe
(MeO)₃ Si—(CH₂)₃—COOEt

The silane compounds listed above are stable by themselves at room temperature. In addition, they improve the adhesiveness of compositions and help to maintain the stability of this good adhesiveness. The silane compounds for component (C) can be utilized in amounts from 0.01 to 10 weight parts, preferably from 0.3 to 5 weight parts, per 100 weight parts of component (A). Employment of less than 0.01 weight part of the component (C) tends to show an insufficient adhesiveness and more than 10 weight parts leads to economic disadvantages.

Component (D)

The Component (D) addition reaction catalyst is utilized to accelerate the addition reactions between alkenyl groups in the component (A) and hydrogen atoms bonded to silicon atoms in the component (B), that is, the curing reaction. Catalysts conventionally utilized for this type of addition curing composition can be employed as the addition reaction catalysts in this invention. These catalysts can be of the platinum type, the palladium type, or of the rhodium type. Examples of platinum type catalysts are chloroplatinic acid, complexes of platinum with an olefin, ketone, or vinyl siloxane, platinum carried on alumina or silica carriers, platinum black, etc. Palladium types include tetrakis(triphenyl phosphine) palladium, a mixture of a palladium black and a triphenyl phosphine, etc. Suitable rhodium type catalysts include tetrakis(triphenyl phosphine) rhodium, a mixture of a rhodium black and a triphenyl phosphine, etc. Usually the platinum types are preferred.

Suitable amounts of these addition reaction catalysts are those which are catalytically effective. For example, suitable amounts of catalysts include those which provide in the range of 0.1 to 1,000 ppm, more desirably 0.3 to 200 ppm of the elementally converted amount of platinum, palladium, or rhodium based on the total weight of the components (A) and (B). Employment of less than 0.1 ppm tends to cause improper curing and the use of more than 1,000 ppm does not increase the effect further and also leads to an economic disadvantage.

Other Suitable Components

The adhesive compositions of this invention can also contain various additives besides the components (A) through (D), as long as the adhesiveness is not degraded. Examples include fillers such as an aerosol silica, precipitated silica, quartz powder, diatomaceous earth, titanium oxide, aluminum oxide, zinc oxide, iron oxide, mica, clay, carbon black, graphite, glass beads, metallic powder and calcium carbonate; agents to improve heat resistance and noninflammability such as cerium hydroxide; pigments; adhesion intensifiers; mold inhibitors; organic solvents such as toluene and hexane; and viscosity controllers, e.g., polydimethyl siloxanes which are of a different type from the component (A). Appropriate conventional amounts of these additives are mixed in as desired, e.g., typically 0.1 to 10 wt. parts per 100 parts by weight of the total weight of Components (A), (B), (C) and (D).

Adhesive Compositions

Adhesive compositions of this invention can be easily prepared by the uniform mixing of the components.

These adhesive compositions possess superior adhesiveness towards various electric and electronic parts, and construction materials, even when cured under low temperature conditions such as at the 60° C. level. This adhesiveness is also very stable and does not degrade during storage of the compositions.

Without further elaboration, it is believed that one skilled in the art can, using the preceding description, utilize the present invention to its fullest extent. The preferred specific embodiments are, therefore, to be construed as merely illustrative, and not limitative of the disclosure in any way whatsoever.

The entire disclosure of all applications, patents and publications, cited above and below, and of corresponding Japanese No. 3-337578, are hereby incorporated by reference.

EXAMPLES

In the examples of this invention, viscosity measurements were carried out at 25° C. Further, the adhesiveness under shearing (kgf/cm²) of the cured products was measured based on the method of JIS K-6850.

EXAMPLE 1

The following reagents were uniformly mixed in order to prepare the compositions 1 through 5: 100 parts of dimethylpolysiloxane (viscosity: 10,000 cp) in which the ends of the molecular chain are terminated with dimethyl vinylsilyl groups, 4.0 parts of methylhydrogen polysiloxane whose average molecular formula is expressed by the equation (2) below:

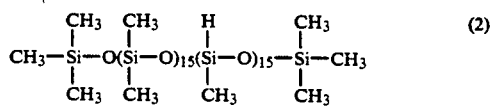

(2)

1.0 part of the adhesion promoters listed below, 0.06 parts of isopropyl alcohol solution of chloroplatinic acid (2 weight % of platinum content), and 27 parts of hydrophobic silica with a BET specific surface area of 170 m²/g.

Adhesion promoters added to each composition are the silane compounds listed below.

Adhesion Promoters 1. (MeO)₃ Si—CH₂—COOMe
2. (MeO)₃ Si—CH(Me)—COOEt
3. (MeO)₃ Si—CH(Me)—COOCH₂ CH (Et) C₄H₉
4. (EtO)₂ (Me)Si—CH(Me)—COOEt
5. (EtO)(Et)₂ Si—CH₂—COOPh.

Comparison composition 6 was prepared without employing the adhesion promoters for the purpose of comparison.

These compositions were coated over float glasses and high performance heat ray reflective glasses, and they were then cured under the conditions shown in Table 1. Values of adhesiveness under shearing were measured for the obtained cured products and the results are listed in Table 1.

TABLE 1

| Curing Conditions | 1 | 2 | 3 | 4 | 5 | 6 |
|---|---|---|---|---|---|---|
| | Float Glass Sample Composition No. | | | | | |
| 60° C. × 1 hour | 27 | 23 | 24 | 25 | 24 | 6 |
| 80° C. × 1 hour | 28 | 25 | 24 | 26 | 23 | 5 |
| | Heat Ray Reflective Glass Sample Composition No. | | | | | |
| 60° C. × 1 hour | 27 | 22 | 25 | 27 | 27 | 6 |
| 80° C. × 1 hour | 29 | 26 | 29 | 28 | 26 | 8 |

In the table, the units of adhesiveness under shearing values are kgf/cm².

The compositions 1 through 6 were coated on a polyvinyl chloride board, an aluminum board, an epoxy resin board, a copper board and an iron board, and then cured for an hour at 60° C. The measured adhesiveness under shearing values for the cured products is summarized in Table 2.

TABLE 2

| | Adhesiveness Under Shearing (kgf/cm²) | | | | | |
|---|---|---|---|---|---|---|
| Compositions | 1 | 2 | 3 | 4 | 5 | 6 |
| polyvinyl chloride | 27 | 24 | 23 | 27 | 26 | 4 |
| epoxy resin | 28 | 25 | 23 | 27 | 25 | 5 |
| aluminum | 27 | 26 | 23 | 29 | 26 | 4 |
| copper | 26 | 24 | 23 | 27 | 26 | 2 |
| iron | 27 | 25 | 24 | 26 | 26 | 1 |

As can be seen, the adhesion compositions of this invention possess an excellent adhesiveness when cured at low temperature conditions, and towards various types of substrates, e.g., at 60° C. Therefore they are extremely useful for the bonding of electric and electronic parts and for bonding in the field of construction.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modification of the invention to adapt it to various usages and conditions.

What is claimed is:

1. An adhesive composition comprising
   (A) a diorganopolysiloxane which contains on average per molecule at least two alkenyl groups which are bonded to silicon atoms,
   (B) an organohydrogen polysiloxane which contains on average per molecule at least three hydrogen atoms bonded to silicon atoms,
   (C) a silane compound of the formula (1):

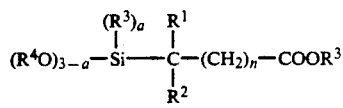

wherein $R^1$ and $R^2$ are hydrogen or alkyl and can be the same or different, each $R^3$ is independently a substituted or an unsubstituted monovalent hydrocarbon group, $R^4$ is alkyl or alkoxyalkyl, $a$ is an integer from 0 to 2, and $n$ is an integer from 0 to 2, and
   (D) an addition reaction catalyst, the amounts of A, B and D being effective to provide an addition-curing type composition and of C being effective as an adhesion promoter.

2. A composition of claim 1, wherein in component A, the alkenyl groups are vinyl, allyl, 1-butenyl or 1-hexenyl.

3. A composition of claim 1, wherein the organo groups of the diorganopolysiloxane component A are alkyl groups or haloalkyl groups and the alkenyl groups of the diorganopolysiloxane component A are vinyl, allyl, 1-butenyl or 1-hexenyl.

4. A composition of claim 1, wherein component A has a viscosity at 25° C. of 50–100,000 cp.

5. A composition of claim 1, wherein in component B the organo groups are alkyl groups or haloalkyl groups.

6. A composition of claim 1, wherein component B has a viscosity at 25° C. of 0.5–10,000 cp.

7. A composition of claim 1, wherein in component C, $R^3$ is alkyl, aryl, alkenyl, aralkyl or one of the foregoing groups having some or all H-atoms replaced by halo.

8. A composition of claim 1, wherein component C is one of the following compounds (MeO)₃ Si—CH₂—COOMe
(MeO)₃ Si—CH₂—COOEt
(MeO)₃ Si—CH₂—COOPr
(MeO)₃ Si—CH₂—COOC₈H₁₇
(MeO)₃ Si—CH₂—COOph
(MeO)₃ Si—CH₂—COOCy
(MeO)₂ (Me)—Si—CH₂—COOMe
(MeO)₂ (Me)—Si—CH₂—COOEt
(MeO)₂ (Me)—Si—CH₂—COOPr
(MeO)₂ (Me)—Si—CH₂—COOC₈H₁₇
(MeO)₂ (Me)—Si—CH₂—COOph
(MeO)₂ (Me)—Si—CH₂—COOCy
(MeO) (Me)₂—Si—CH₂—COOMe
(MeO) (Me)₂—Si—CH₂—COOEt
(MeO) (Me)₂—Si—CH₂—COOPr
(MeO) (Me)₂—Si—CH₂—COOC₈H₁₇
(MeO) (Me)₂—Si—CH₂—COOPh
(MeO) (Me)₂—Si—CH₂—COOCy
(EtO)₃ Si—CH₂—COOMe
(EtO)₃ Si—CH₂—COOEt
(EtO)₃ Si—CH₂—COOPr
(EtO)₃ Si—CH₂—COOBu
(EtO)₃ Si—CH₂—COOC₈H₁₇
(EtO)₃ Si—CH₂—COOph
(EtO)₃ Si—CH₂—COOCy
(EtO)₂ (Me)—Si—CH₂—CooMe
(EtO)₂ (Me)—Si—CH₂—COOEt
(EtO)₂ (Me)—Si—CH₂—COOPr
(MeO)₃ Si—CH(Me)—COOMe
(MeO)₃ Si—CH(Me)—COOEt
(MeO)₃ Si—CH(Me)—COOPr
(MeO)₃ Si—CH(Me)—COOBu
(MeO)₃ Si—CH(Me)—COOC₈H₁₇
(MeO)₃ Si—CH(Me)—COOCH₂ CH (Et) C₄H₉
(MeO)₃ Si—CH(Me)—COOPh
(MeO)₂ (Me) Si—CH(Me)—COOMe
(MeO)₂ (Me) Si—CH(Me)—COOEt
(MeO)₂ (Me) Si—CH(Me)—COOBu
(MeO)₂ (Me) Si—CH(Me)—COOCH₂ CH (Et) C₄H₉
(MeO)₂ (Me) Si—CH(Me)—COOPh
(MeO) (Me)₂ Si—CH(Me)—COOMe
(MeO) (Me)₂ Si—CH(Me)—COOEt
(MeO) (Me)₂ Si—CH(Me)—COOC₈H₁₇
(MeO) (Me)₂ Si—CH(Me)—COOph $(MeO)_2(Ph)Si-CH(Me)-COOMe$
$(MeO)_2(Ph)Si-CH(Me)-COOEt$
$(MeO)_2(Ph)Si-CH(Me)-COOC_8H_{17}$
$(MeO)_2(Et)Si-CH(Me)-COOMe$
$(MeO)_2(Et)Si-CH(Me)-COOEt$
$(MeO)_2(Et)Si-CH(Me)-COOBu$
$(EtO)_3Si-CH(Me)-COOMe$
$(EtO)_3Si-CH(Me)-COOEt$
$(EtO)_3Si-CH(Me)-COOBu$
$(EtO)_3Si-CH(Me)-COOCH_2CH(Et)C_4H_9$
$(EtO)_2(Me)Si-CH(Me)-COOMe$
$(EtO)_2(Me)Si-CH(Me)-COOEt$
$(EtO)_2(Me)Si-CH(Me)-COOBu$
$(EtO)_2(Me)Si-CH(Me)-COOCH_2CH(Et)C_4H_9$
$(EtO)_2(Me)Si-CH(Me)-COOMe$
$(EtO)_2(Me)Si-CU(Me)-COOEt$
$(MeO)_3Si-CH(Et)-COOMe$
$(MeO)_3Si-CH(Et)-COOEt$
$(MeO)_2(Me)Si-CH(Et)-COOMe$
$(BuO)_3Si-CH_2-COOMe$
$(BuO)_3Si-CH_2-COOEt$
$(C_8H_{17}O)_3Si-CH_2COOEt$
$(MeO)_3Si-(CH_2)_2-COOMe$
$(MeO)_3Si-(CH_2)_2-COOEt$
$(MeO)_3Si-(CH_2)_3-COOMe$
$(MeO)_3Si-(CH_2)_3-COOEt$ 9. A composition containing an amount of component B sufficient to provide 0.5 to 10 equivalents of H atoms bonded to Si atoms per equivalent of alkenyl groups bonded to Si atoms in component A, an amount of component C which is 0.01 to 10 weight parts per 100 weight parts of component A, and a catalytically effective amount of component D.

10. A cured product prepared by curing a composition of claim 1.

* * * * *